United States Patent [19]

Herbert

[11] Patent Number: 4,826,198

[45] Date of Patent: May 2, 1989

[54] TRACTOR-TRAILER CONTROL APPARATUS

[76] Inventor: William B. Herbert, R.D. #2, Box 448, Pine Bush, N.Y. 12566

[21] Appl. No.: 174,763

[22] Filed: Mar. 29, 1988

[51] Int. Cl.⁴ .................... B62D 6/00; B62D 53/08
[52] U.S. Cl. ............................. 280/432; 280/455.1
[58] Field of Search .......... 280/432, 433, 434, 438 R, 280/438 A, 446 B

[56] References Cited

U.S. PATENT DOCUMENTS 3,874,699  4/1975  Hayes et al. ...................... 280/432

FOREIGN PATENT DOCUMENTS 2549374  5/1977  Fed. Rep. of Germany ...... 280/432

Primary Examiner—Charles A. Marmor
Assistant Examiner—Mitchell J. Hill
Attorney, Agent, or Firm—Jack D. Slobod

[57] ABSTRACT

Anti-jackknifing apparatus beneath the fifth wheel of a tractor-trailer vehicle includes a control ring carried rotably by the tractor and coupled to the trailer by interfering vertical projections directed from each of the tractor and the control ring. A sector plate, shiftable between angular stops, is mounted on the tractor coaxial with the control ring and carries three angularly spaced apart braking devices for selectively gripping the control ring. The central one of the braking devices grips the control ring in response to application of the vehicle service brakes while a control valve causes the other braking devices to grip the control ring in response to angular shifting of the sector plate.

10 Claims, 1 Drawing Sheet

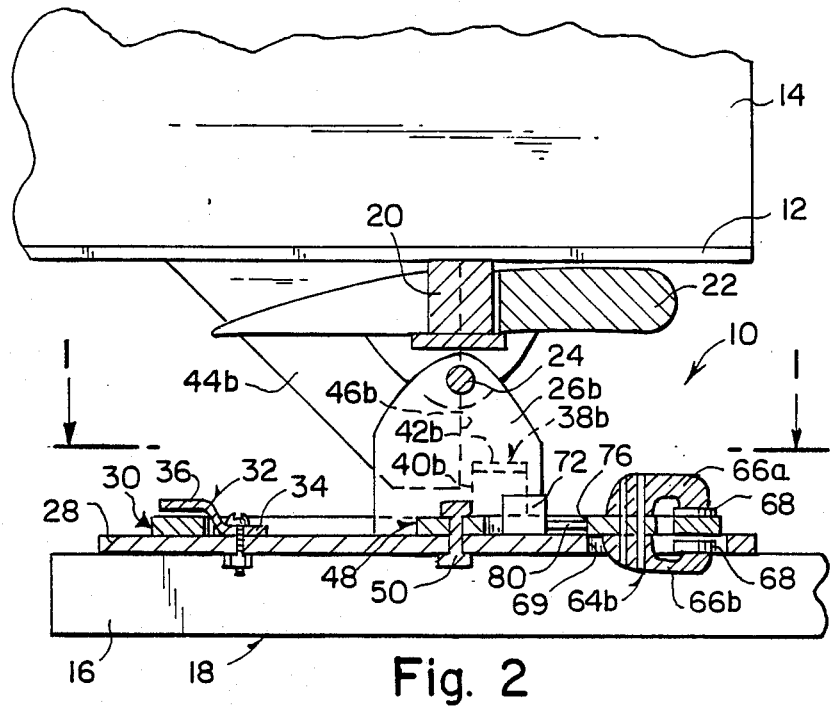
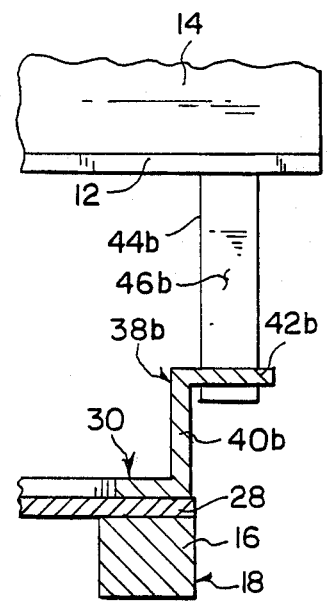
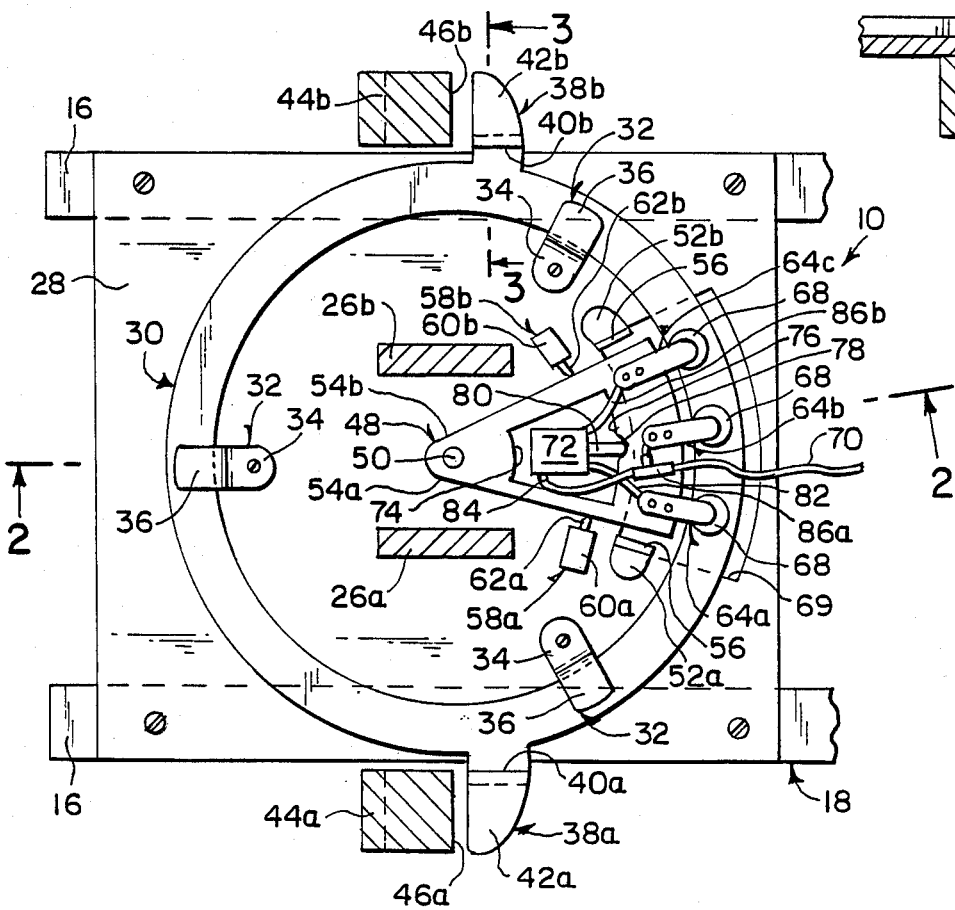
Fig. 2
Fig. 3
Fig. 1

TRACTOR-TRAILER CONTROL APPARATUS

FIELD OF THE INVENTION

The present invention relates to anti-jackknifing devices for tractor-trailer vehicles utilizing braking means to oppose increasing relative angulation of the tractor and trailer when the service brakes of the vehicle are applied. In its particular aspects, the present invention relates to such an anti-jackknifing system utilizing plural braking means.

BACKGROUND OF THE INVENTION

The prior art has provided much attention to the problem of arresting lateral swinging of the trailer portion of a tractor-trailer before a jackknifing occurs. Since the tractor and trailer must be free to angulate relative to each other for maneuvering purposes, it is neither possible to rigidly couple the tractor and trailer nor to provide constantly active angular movement limitation stops. One method of solution to this problem is to provide for arresting of relative angular movement of the tractor and trailer only in response to application of the service brakes of the vehicle. However, a rigid locking together of the tractor and trailer on application of the service brakes creates serious control instability for the driver.

In my prior patent, U.S. Pat. No. 4,452,466 issued June 5, 1984, I provided apparatus that, in response to application of the service brakes of the vehicle, would limit further relative angulation of the tractor and trailer within angular stops established by the limits of travel on an angularly shifting caliper brake device cooperating with a control ring carried by the tractor and coupled by a hitch to the trailer to be responsive to angulation of the trailer. Therein the caliper brake device would, in response to application of the service brakes, and increasing relative angulation of the tractor and trailer, tend to dissipate offensive rotational energy. However, the environment of the control ring has been such that it has been difficult to keep clean so that full braking power can be applied thereto by the caliper brake device.

My prior invention would benefit from a redesign of the braking device to provide for a higher degree of braking reliability. Furthermore, a more easily accomplished coupling not requiring the physical attachment of a hitch between the control ring and the trailer would also be beneficial. This invention is based, in part, on my Disclosure Document No. 167703, filed Apr. 6, 1987 and the amendment thereto by Disclosure Document No. 175957, filed Aug. 21, 1987.

OBJECTS OF THE INVENTION

It is an object of the present invention to provide anti-jackknifing apparatus for a tractor-trailer which will overcome the shortcomings of prior art devices.

It is a further, and more specific, object of the present invention to provide anti-jackknifing apparatus that is easily maintained and does not require additional steps in coupling or uncoupling the tractor and trailer.

It is still another object of the present invention to provide anti-jackknifing apparatus which is automatically operable in a highly reliable fashion.

SUMMARY OF THE INVENTION

The aforementioned and other objects of the invention are satisfied by providing a control apparatus for a tractor-trailer including a substantially horizontal control ring carried by the tractor below the fifth wheel for angulation about a central axis substantially co-axial with the kingpin of the tractor. A coupling comprising a pair of downwardly directed projections from the underside of the trailer and a cooperating pair of vertically upwardly directed projections from the control ring causes the control ring and the trailer to angulate relative to the tractor as a unit. This coupling is configured so as not to require any additional engagement steps beyond the usual coupling of the kingpin in the fifth wheel.

A sector-shaped brake support means is mounted for angulation, between angular stops, around an axis co-axial with the control ring and includes three angularly spaced-apart caliper brake devices, each positioned to selectively grip the control ring. A central one of the brake devices is hydraulically coupled to the vehicle service brake system so as to actuate in direct response to application of the vehicle service brakes. This actuation causes the brake support means to angulate with the control ring between the angular stops. A control valve and follower, also coupled hydraulically to the vehicle service brakes, senses the angular movement of the brake support means toward either of the angular stops and in response to a predetermined angular movement from a central normal position, causes the other two caliper brake devices to actuate for gripping the control ring and thereby provide a force opposing further relative angulation of the tractor and trailer when the brake support means reaches an angular stop.

The use of angularly spaced-apart separate and distinct brake devices provides redundancy in case either of the outer brake devices should fail and further allows the central one of the brake devices to wipe the control ring, thereby presenting a clean control ring surface to the outer brake devices.

BRIEF DESCRIPTION OF THE DRAWING

Other objectives, features and advantages of the invention will become apparent upon perusal of the following detailed description of the preferred embodiments of the invention when taken in conjunction with the appended drawing wherein:

FIG. 1 is a cross-sectional plan view of the tractor-trailer control apparatus of the present invention taken along the lines 1—1 in FIG. 2;

FIG. 2 is a cross-sectional elevational side view of the tractor-trailer control apparatus taken along the lines 2—2 in FIG. 1; and FIG. 3 is a partial elevational cross-sectional front view of the control apparatus taken along the lines 3—3 in in FIG. 1.

DETAILED DESCRIPTION OF THE PREFERRED EMBODIMENT

Referring to the drawing and, in particular, to FIGS. 1 and 2, there is shown the control device 10 of the present invention in conjunction with the lower front frame 12 of a trailer 14 and the rear frame 16 of a tractor 18. The frame 12, which comprises the underside of the front portion of trailer 14 has the usual downwardly projecting kingpin 20. The usual fifth wheel pad 22 carried by tractor 18 has the usual longitudinal rearwardly directed slot (now shown) for receiving kingpin 20 as the tractor 18 is backed into the front of trailer 14. The result of the engagement of fifth wheel pad 22 and kingpin 20 is to permit relative angulation of the tractor 18 and trailer 14 about the vertical axis of kingpin 20. To facilitate mating of the kingpin 20 and fifth wheel pad 22, in a conventional manner, fifth wheel pad 22 is mounted rockably about transverse axle 24 carried by vertical saddle arms 26a, 26b upstanding from horizontal base plate 28 which is in turn rigidly secured to tractor frame 16.

Base plate 28 carries an annular generally planar horizontal metal control ring 30 for angular movement around an axis co-axial with the axis of kingpin 20. This is accomplished by means of three radially directed holddown dogs 32, equi-angularly spaced around the circumference of control ring 30. Each dog 32 has a radially inwardly directed pad 34 secured to base plate 28 and a radially outwardly directed pad 36 bearing slideably on the upper face of control ring 30.

With reference now also to FIG. 3, the control ring 30 also has a pair of diametrically opposed wiings 38a, 38b which are bent out of the plane of control ring 30 to have upwardly projecting portions 40a, 40b terminated by elevated radially outwardly directed horizontal portions 42a, 42b. Corresponding thereto are a pair of transversely spaced apart downwardly projecting rigid webs 44a, 44b depending from lower front trailer frame 12. Webs 44a, 44b are located with their front vertical planar surfaces 46a, 46b substantially in line with the axis of kingpin 20 to engage the elevated horizontal portions 42a, 42b of control ring 30. The result is that as the tractor 18 and trailer 14 angulate relative to each other, the control ring wings 38a, 38b and the webs 44a, 44b form a coupling such that the trailer 18 and control ring 30 substantially angulate as a unit relative to the tractor 18. It should further be apparent that the holddown dogs 32 are secured to base plate 28 within the inner diameter of control ring 30 and do not project outside the outer diameter of control ring 30 in order not to interfere with the angular movement of control ring 30 and in particular the movement of wings 38a, 38b thereof.

The means for arresting undesireable relative angulation of the tractor 18 and trailer 14 comprises a sector-shaped generally horizontal planar brake support 48 which is mounted for angulation about vertical axle 50 passing through base plate 28 and the apex of brake support 48 co-axially with control ring 30 and kingpin 20. The sector-shaped brake support 48 is co-planar with control ring 30 and is sized to fit slideably within the inside diameter of the control ring 30. Stops 52a, 52b project upward from base plate 28 at positions angularly spaced from the radially directed sides 54a, 54b of brake support 48 so as to define an angular range of movement for the brake support 48. This range is preferably 4½ degrees in either direction from a normal position at the center of said 9 degree total range. The stops 52a, 52b preferably have a resilient lining 56, as of rubber, to be engaged by a brake support side 54a or 54b as the same may come in contact therewith. Mounted on the base plate 28 proximate to stops 52a, 52b are hydraulic dampers 58a, 58b including tangentially directed elongated hydraulic cylinders 60a, 60b and pistons or plungers 62a, 62b which engage a brake support side 54a, 54b when the brake support 48 angulates from its normal or central position toward either stop and damper combination 52a, 58a or 52b, 58b by a predetermined angular amount less than the plus or minus 4 ½ degrees angular position of the stops 52a, 52b. As either piston 62a or 62b is caused by angulation of brake support 28 to engage a side thereof, continued angular movement in the same direction causes retraction of the engaged piston 62a or 62b into its associated cylinder 60a or 60b so as to provide a viscous damping force exerted by the engaged piston on the brake support 48 in proportion to the angular velocity of the brake support.

Mounted on brake support 48 are three substantially identical separate and distinct angularly spaced apart radially directed hydraulic caliper brake devices 64a, 64b and 64c. Each brake device is fixedly secured to the brake support 48 and includes opposed radially outwardly projecting upper and lower jaws 66a and 66b carrying horizontal brake pads 68 normally slightly spaced above and below the control ring 30. A cutout 69 is provided in the base plate 28 for clearance for lower jaws 66b. In response to application of hydraulic pressure to a braking device 64a, 64b or 64c, the jaws 66a and 66b of said device are caused to squeeze toward each other resulting in the associated brake pads 68 carried by said jaws exerting a frictional force on control 30. The central one of said brake devices, 64b, is coupled by conduit 70 to the service brakes of the tractor-trailer so that application of the service brakes will cause brake device 64b to frictionally engage control ring 30 causing brake support 48 to angulate with the control ring as a unit, within the angular limits established by stops 52a, 52b.

The operation of the other two brake devices 64a and 64c is controlled by valve 72 mounted on base plate 28 and located within a cutout 74 in brake support 48. Cutout 74 includes a generally radial curve 76 having a central Vee shaped detent notch 78. Valve 72 includes a telescoping spring-loaded follower 80 cooperating with curve 76 and in particular the detent notch 78 thereof. The cooperation of follower 80 and notch 78 causes the brake support 48 to normally be positioned at its normal central angular position with the follower 80 at the center of the notch 78 when the brake support 48 angulates from this central position, which it does in response to actuation of brake device 64b as heretofore described. The notch 78 is shaped to trigger the valve 72 at a predetermined angular movement from said normal position which is preferably somewhat less than the angular limits established by stops 52a, 52b. In response thereto, the valve 72, which is hydraulically coupled to service brake hydraulic conduit 70 via tee 82 and conduit 84, and coupled hydraulically to brake devices 64a and 64c by conduits 86a and 86b, causes both said brake devices to actuate and frictionally engage the control ring 30. The result is that as the brake support engages a stop 52a or 52b, causing a retarding force to halt the movement thereof in the same direction, this retarding force is transferred to the control ring 30 by all three braking devices 64a, 64b and 64c and to the trailer 14 by means of the coupling comprising webs 44a, 44b and control ring wings 38a, 38b. Further, in the event the resilience of the stop lining 56 provides sufficient force to cause relative angulation reversal of direction, the brake support 48 will move toward its central position causing the follower and detent 80 78 to detect this return and cause valve 72 to release brake devices 64a and 64c. If the service brakes of the tractor-trailer vehicle remain engaged, the brake support 48 might continue moving in the opposite direction setting up an angular oscillation of the trailer relative to the tractor in which the brake devices 64a and 64c chatter on and off in a manner to dissipate the energy in said oscillation.

The design herein offers several advantages in that the control device 10 operates automatically without driver intervention. The coupling comprising the webs 44a, 44b and wings 38a, 38b are automatically engaged when the kingpin 20 and fifth wheel pad 22 are engaged. Further, the use of separate and distinct brake devices 64a, 64b and 64c not only provide redundancy if either of the other brake devices 64a, 64c fail, but also deal with the problem of keeping the upper and lower surfaces of the control ring sufficiently clean to maximize the amount of frictional force producable by the brake devices 64a, 64b and 64c co-acting therewith. In practice the central brake device 64b will be actuated each time the service brakes are actuated causing the central braking device 64b to wipe the upper and lower surfaces of the control ring 30. As the outer braking devices 64a or 64c are needed, due to excessive relative angulation of the trailer 14 and tractor 18, this wiped area of the control ring 30 will move toward one of the outer braking devices 64a or 64c to be engaged thereby in a manner to apply a full frictional force thereon.

While the preferred embodiment of the anti-jackknifing device of the present invention has been described in particular detail it should be appreciated that numerous modifications, or additions to or omissions in said details are possible within the intended spirit and scope of the invention.

What is claimed is:

1. A control apparatus for a tractor and trailer coupled for relative angulation by a fifth wheel carried by the tractor and a mating substantially vertically directed kingpin carried by the trailer, said tractor and trailer having a fluid braking system responsive to a brake pedal in the tractor, said control apparatus comprising:
   (a) a substantially horizontal control ring carried by the tractor for angulation about a central axis substantially coaxial with the kingpin;
   (b) coupling means carried by the control ring and the trailer for causing the trailer and control ring to angulate, substantially as a unit, relative to the tractor;
   (c) brake support means carried by the tractor for angulation about said central axis and relative to a normal angular position;
   (d) a plurality of angularly spaced apart braking devices carried fixedly by said brake support means, including a central braking device, each of said braking devices having a frictional surface for selectively engaging the control ring radially of the location of said braking device in response to fluid pressure control to said braking device;
   (e) fluid coupling means between one of said braking devices and said fluid braking system for causing said central braking device to engage the control ring with its frictional surface in direct response to application of the brake pedal, thereby causing the brake support means to angulate with the control ring;
   (f) angular stop means carried by the trailer and engageable by the brake support means for limiting the angular movement of the brake support means from its normal position to an angular displacement limit; and
   (g) valve and angle sensing means coupled to the brake support means for determining when the angular position of the brake support means relative to its normal position exceeds a predetermined angular displacement, less than said angular displacement limit, and coupled fluidly to the braking system and the other(s) of said braking devices for causing the frictional surfaces of the said other braking device(s) to engage the control ring in response to said predetermined angular displacement being exceeded.

2. The apparatus of claim 1 wherein said coupling means comprises a pair of downwardly directed projections from the underside of said trailer on opposite sides of the kingpin and a cooperating pair of diagonally opposed upwardly directed projections from the control ring.

3. The apparatus of claim 1 wherein said valve and sensing means includes a detent, of a predetermined angular width, carried by the brake support means and valve and follower means carried by the tractor in a position to contact the center of the detent when the brake support means is in its normal angular position.

4. The apparatus of claim 2 wherein said valve and sensing means includes a detent, of a predetermined angular width, carried by the brake support means and a valve and follower means carried by the tractor in a position to contact the center of the detent when the brake support means is in its normal angular position.

5. The apparatus of claim 1 further comprising damping means carried by said tractor and positioned for engaging said brake support means when the angular position of said brake support means exceeds a second predetermined angular displacement, less than said angular displacement limit, said damping means providing a restraining force on said brake support means increasing with the angular velocity of said brake support means.

6. The apparatus of claim 2 further comprising damping means carried by said tractor and positioned for engaging said brake support means when the angular position of said brake support means exceeds a second predetermined angular displacement, less than said angular displacement limit, said damping means providing a restraining force on said brake support means increasing with the angular velocity of said brake support means.

7. The apparatus of claim 3 further comprising damping means carried by said tractor and positioned for engaging said brake support means when the angular position of said brake support means exceeds a second predetermined angular displacement, less than said angular displacement limit, said damping means providing a restraining force on said brake support means increasing with the angular velocity of said brake support means.

8. The apparatus of claim 4 further comprising damping means carried by said tractor and positioned by engaging said brake support means when the angular position of said brake support means exceeds a second predetermined angular displacement, less than said angular displacement limit, said damping means providing a restraining force on said brake support means increasing with the angular velocity of said brake support means.

9. The apparatus of claim 3 wherein said detent and said valve and follower means are located within a cutout in said brake support means.

10. The apparatus of claim 4 wherein said detent and said valve and follower means are located within a cutout in said brake support means.

* * * * *